March 10, 1970     F. C. EICKENHORST     3,499,312
SENSING APPARATUS
Filed Feb. 16, 1968
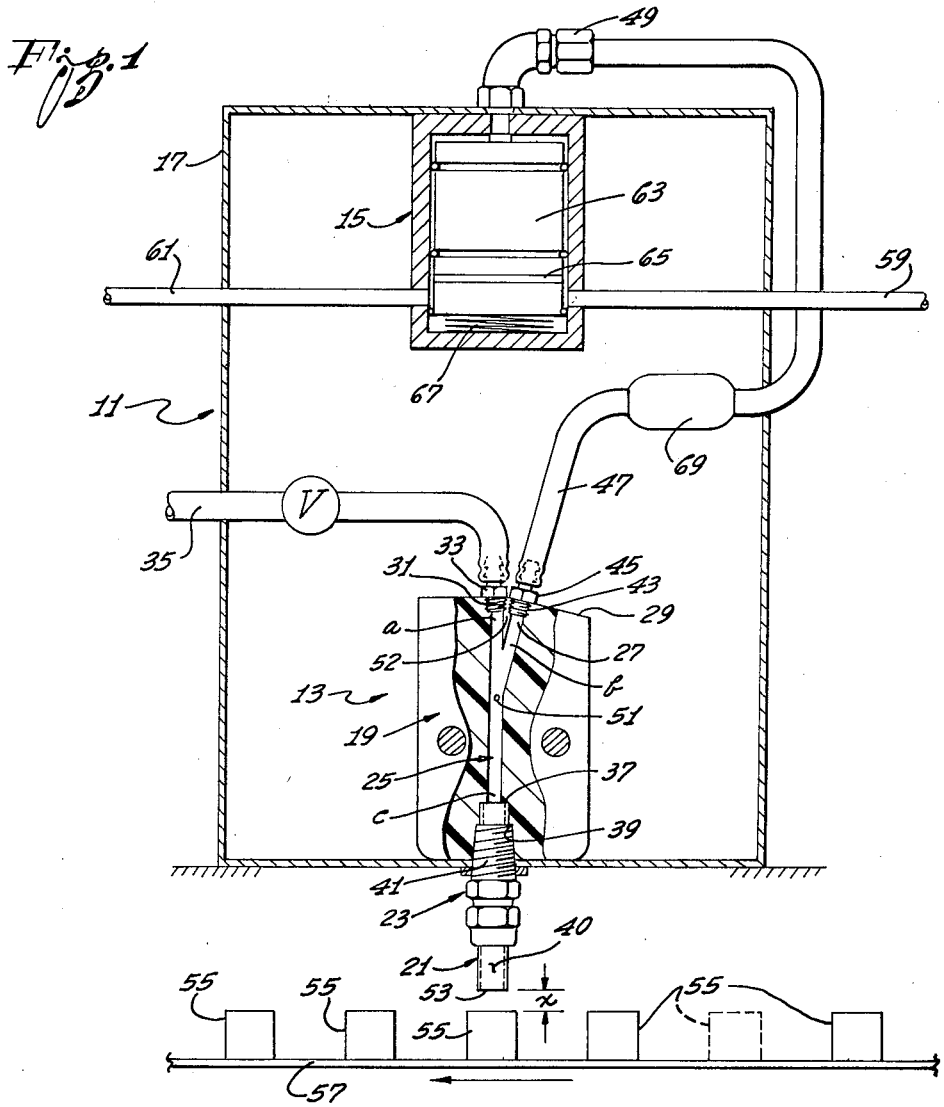
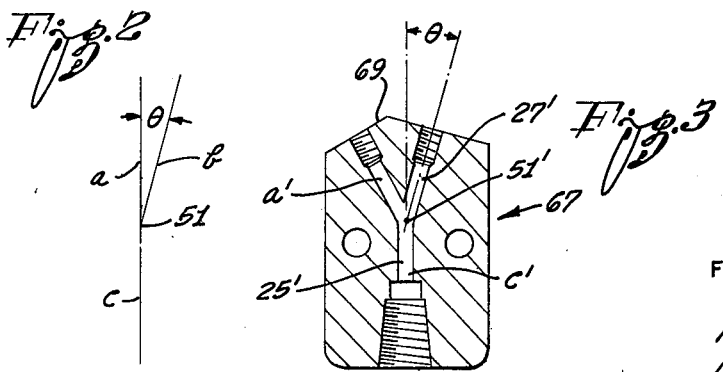
INVENTOR:
FRANKLIN C. EICKENHORST
ATTORNEYS 3,499,312
SENSING APPARATUS
Franklin C. Eickenhorst, Mason, Ohio, assignor to Dayton Reliable Tool & Mfg. Company, Dayton, Ohio, a corporation of Ohio
Filed Feb. 16, 1968, Ser. No. 706,090
Int. Cl. G01b 13/08
U.S. Cl. 73—37.5          15 Claims

ABSTRACT OF THE DISCLOSURE

This disclosure describes a sensing apparatus utilizing a proximity sensor of the back pressure sensing type. The proximity sensor is supplied with a control fluid, such as air, which flows through the sensor and exits at a sensing passageway. If an object is placed closely adjacent the opening of the sensing passageway and in confronting relationship thereto, a back pressure is created which diverts some of the fluid flow through a back pressure passageway. Flow of a predetermined amount of fluid through the back pressure passageway provides a signal which can be utilized to perform various control functions.

BACKGROUND OF THE INVENTION

In many production and manufacturing operations it becomes necessary to sense or detect the presence or absence of an object or a component thereof at various locations along the production line. Following the detecting operation, it may be desirable to actuate or shut down various pieces of equipment depending upon whether or not an object is missing or incomplete. For example, if an object is incomplete because a portion thereof has not been assembled thereon, it may be desirable to shut down the production equipment or to actuate other equipment which removes the faulty unit from the production equipment.

Because of its relative simplicity it has been proposed to utilize a proximity sensor and a fluidic system to accomplish the detecting and related functions. The proximity sensor may be of the back pressure type and include a supply passageway connectable to a source of control air and having an opening through which the air exits from the sensor and impinges against the object. A back pressure passageway is joined to the supply passageway at an intermediate region thereof and extends from such region outwardly to the outer surface of the sensor. In operation of the device, the opening in the supply passageway is positioned so that items or objects to be detected will be brought, in sequence, adjacent such opening. When an object is brought closely adjacent the opening, a back pressure is created which causes flow of at least a predetermined amount of the control fluid from the supply passageway to the back pressure passageway. Flow of the predetermined amount of fluid through the back pressure passageway serves as a control signal which can be utilized to operate various fluidic devices to cause the appropriate control function to occur.

For many applications it is important that the sensor be able to detect the presence of an object which is spaced significantly, for example, .010 inch to about .156 inch from the outlet of the sensor. If a sensor does not have this capability, the allowable tolerances of the object being detected may be sufficient to cause the detector to give a false detection reading. For example, if the maximum sensing distance of a proximity sensor is .008 inch and the allowable tolerance of the part being detected is plus or minus .005 inch, a false detection reading might be obtained as a result of variance of dimensions of the object within the allowable tolerance range. Although some literature on proximity sensors states that the maximum sensing distance or gap may be substantial and may be up to ¼ inch, it has been found through actual tests that the minimum sensing distance for back pressure proximity sensor of this type is from about .005 inch to about .008 inch, and that outside of this range, proximity sensors of the prior art are either inoperative or produce extremely erratic results.

For many production applications, it is important that the sensor be able to sense a large number of individual parts each minute. Another problem with prior art proximity sensors is that the hysteresis is so high that only about 200 parts per minute can be detected. This is not sufficient for many production operations.

SUMMARY OF THE INVENTION

The present invention provides a reliable proximity sensor for use in a fluidic system in which the maximum sensing distance can exceed .156 inch so that the allowable tolerances of the parts being detected presents no problem. The maximum sensing distance can be easily and accurately varied. The proximity sensor of this invention has little hysteresis to the extent that it is theoretically possible to check or detect 12,000 parts per minute with this proximity sensor.

These advantageous results are attributable, in part, to construction of the proximity sensor so that the back pressure passageway and the outlet leg of the supply passageway intersect to form an included angle greater than 90°. Stated differently the angle formed by the back pressure passageway and an extension of the axis of the outlet leg of the supply passageway is less than 90°. Preferably this last mentioned angle is from about 10° to about 20°, but for still further improved results, the angle should be between about 14° to about 15° with optimum results being obtained at an angle of 14½°.

According to a preferred form of this invention, the back pressure passageway and the supply passageway are provided in a body member. A sensing tube having a sensing passageway therein is connectable to the body member in communication with the outlet of the supply passageway for directing the control air against the object. The advantageous results obtained with this invention are caused in part, by maintaining the cross sectional area of the passageway through the sensing tube greater than the cross sectional area of the supply passageway. Preferably the sensing passageway and the passageways in the body member are all generally circular in cross section with the sensing passageway having a diameter at least about 1/32 inch larger than the diameter of the supply passageway. For optimum results the sensing passageway and all of the passageways within the body member are cylindrical. These passageways should be straight or curved only slightly as they extend axially.

The construction of the passageways within the body member also contributes to the advantageous results obtainable with this invention. This portions of the passageways within the body member extending outwardly from the region of intersection of the supply and back pressure passageways define three passage sections that should be of substantially equal length and of substantially equal cross sectional area. Preferably, each of the passage sections are generally cylindrical and at least ½ inch in length with a length of 1½ inch giving optimum results. All of the passageways of the sensor through which control air flows should be smoothed-walled and no rougher than a number 16 micro finish to produce laminar flow of the control fluid through the passageways.

It has been found that the sensing distance can be varied by varying the several sensing tube parameters and holding the relationships of the remainder of the proximity sensor constant. For example, it has been determined experimentally for a proximity sensor constructed to produce optimum results in the manner set forth above, that the maximum sensing distance is substantially equal to the diameter of the sensing passageway divided by four and that this relationship is true at least for sensing distances of up to .156 inch. Thus, with the present invention, the maximum sensing distance increases with an increase in the internal diameter sensing tube. Heretofore, it had been common practice to restrict the sensing tube passageway in an effort to increase the maximum sensing distance.

One practical advantage of the relationships described in the preceding paragraph is that the body member of the proximity sensor can be constructed to produce the maximum desired sensing distance. The sensing tube is then constructed so as to be removably connected to the body member so that by changing sensing tubes, the maximum sensing distance can be varied as desired. The maximum sensing distance should be held at a minimum to avoid excessive loss of control air.

With the present invention, the pressure of the control air or fluid has virtually no effect on the maximum sensing distance so long as the control air is supplied at a pressure of at least one half p.s.i. It is normally desirable to have the control air pressure as low as possible and with the present invention such air pressure may be in the range of ½ to 10 p.s.i.

When an object is placed within the maximum sensing distance from the opening in the sensing tube, the flow of control air therethrough is restricted. This causes flow of at least a predetermined amount of air from the supply passageway through the back pressure passageway. This predetermined amount of control air constitutes a signal which can be used to perform various control functions. Of course, when the flow of air through the back pressure passageway increases due to restricting the flow through the sensing tube, the pressure in the back presure passageway will also increase. This increased air flow and pressure may be used, for example, as an input signal to a fluid amplifier.

The invention, both as to its organization and method of operation together with further features and advantages thereof may best be understood by reference to the following description taken in connection with the accompanying illustrative drawing.

BRIEF DESCRIPTION OF THE DRAWING

FIG. 1 is a semi-diagrammatic view of a sensing apparatus with portions of the proximity sensor being shown in section.

FIG. 2 is a digrammatic view illustrating the angle between the supply and back pressure passages.

FIG. 3 is a sectional view through a modified form of proximity sensor.

DESCRIPTION OF THE PREFERRED EMBODIMENTS

Referring to the drawing and in particular to FIG. 1 thereof, reference numeral 11 designates a sensing apparatus constructed in accordance with the teachings of this invention. Generally, the sensing apparatus 11 includes a proximity sensor 13 and an output device 15 in the form of a fluid amplifier mounted on a suitable supporting structure 17. The proximity sensor may also be suitably mounted on the supporting structure 17.

The proximity sensor 13 generally includes a body member 19 and a sensing tube 21 releasably connected to the body member by a threaded coupling 23. The body member 19 has a supply passageway 25 extending therethrough and a back pressure passageway 27 in communication therewith and opening at an outer surface 29 of the body member. The supply passageway 25 has an internally threaded inlet 31 into which a suitable threaded fitting 33 is secured. The fitting 33 interconnects the inlet 31 with a supply conduit 35 which supplies a control fluid such as air to the supply passageway 25. The supply conduit 35 may be provided with control or shutoff valves as may be necessary.

The opposite end of the supply passageway 25 is stepped to provide annular shoulders 37 and 39 and the outermost section of the passageway 25 is internally threaded. The sensing tube 21, which has a sensing passage 40 extending therethrough, extends through the coupling 23 and the inner end thereof abuts the shoulder 37. The coupling 23 is a standard connector having an externally threaded portion 41 which is threaded into the internally threaded section of the supply passageway 25 and retains the sensing tube 21 tightly against the shoulder 37 in a conventional manner.

The back pressure passageway 27 has an outlet 43 which is internally threaded to receive a threaded fitting 45. A conduit 47 is connected to the fitting 43 and to a suitable fitting 49 to thereby provide a fluid passageway between the back pressure passageway 27 and the fluid amplifier 15.

As shown in FIG. 1 and illustrated diagrammatically in FIG. 2, the axes of the passageways 25 and 27 intersect at a point 51. The passageways 25 and 27 define three passage sections or legs $a$, $b$ and $c$, extending outwardly from the point of intersection 51. The axis of the section $b$ intersects an extension of the axis of the section $c$ to define an angle theta. In the form shown in FIGS. 1 and 2 the extension of the axis of section $c$ coincides with the axis of section $a$. Through actual testing, it has been determined that to maintain hysteresis at a minimum and to maximize the sensing distance, the angle theta should be less than 90° and preferably within the range of 10° to 20°. A narrower preferred range giving still better results is 14° to 15° with optimum results being obtainable when theta equals 14½°.

The passageways 25 and 27 have smooth walls. Although a surface finish of number 16 micro finish is acceptable, a number 8 micro finish is preferred.

To further minimize hysteresis and to lengthen the maximum sensing distance, these passage sections $a$, $b$, and $c$ should be of equal cross sectional areas for equal distances outwardly of the point of intersection 51. For optimum results, each of the passage sections $a$, $b$ and $c$ are cylindrical with the diameters of each of the passage sections being equal and with the lengths of each of the passage sections being equal. In the embodiment illustrated, the passage section $a$ extends from the point of intersection 51 to the threaded inlet 31, the passage section $b$ extends from the point of intersection 51 to the threaded outlet 43, and the passage section $c$ extends from the point of intersection 51 to the sensing tube 21.

To further improve results, the passage sections $a$, $b$, and $c$ should have a minimum length of about ½ inch per passage section. If passage sections of less than ½ inch are used, turbulance will occur in the area of intersection of the passages 25 and 27. For optimum results, each of the passage sections $a$, $b$, and $c$ should be about 1½ inches long. The body member 19 has a portion 52 intermediate passage sections $a$ and $b$ which defines a relatively sharp point. Ideally this point should be rounded; however, the body member is easier to manufacture with the portion 52 defining a point.

The diameter of the passage sections $a$, $b$, and $c$ preferably are within plus or minus .005 inch of each other and not greater than plus or minus .010 inch. The best results are obtained if the diameters of the passage sections $a$, $b$ and $c$ are within plus or minus .001 inch. The length of the passage sections $a$, $b$ and $c$ should not vary more than plus or minus 1/16 inch and if a variation of plus or minus ⅛ inch is permitted, the maximum sensing distance may be significantly reduced. A relatively small improvement results if the inlet passageway 25 is straight rather than curved or inclined.

Another important relationship that is responsible, in part, for the improved results produced by this invention is the utilization of a sensing passageway 40 of larger cross sectional area than the passage section c. Preferably, the sensing passageway 40 is of circular cross section with optimum results being obtainable when this passageway is cylindrical. Preferably, the diameter of the sensing passageway 40 is at least 1/32 inch greater than the diameter of the passage section c. It has been found that the maximum sensing distance drops off significantly if the diameter of the sensing passageway is less than 1/32 inch greater than the diameter of the passage section c.

The sensing tube 21 has an opening 53 therein which forms an outlet of the sensing passage 40. In use of the sensing apparatus 11, the opening 53 is positioned so that a series of objects 55 can be sequentially brought into alignment with the opening. For purposes of illustration, the objects 55 are illustrated as being positioned on a conveyor 57, it being understood that the object and the means for moving such objects can take various forms. The conveyer 57 will move the objects either intermittently or continuously to a position beneath the opening 53. The spacing or gap between the opening 53 and the upper surface of the object 55 intermediately therebelow is given the dimension $x$ in FIG. 1. The maximum sensing distance must be at least equal to $x$ plus the allowable tolerance of the object 55.

Control air flows continuously through the conduit 35, the passageway 25 and the sensing tube 21. When there is no object 55 immediately beneath the opening 55, substantially all of the control air will flow out through such opening. However, when an object 55 is brought beneath the opening 53, and within the maximum sensing distance therefrom, the flow of air through the opening is restricted to thereby cause an increase in pressure and flow of the control air from the passage section $a$ into the back pressure passageway 27. With the object 25 positioned beneath the opening 53, the pressure in the conduit 47 is sufficient to actuate the fluid amplifier to provide communication between a supply conduit 59 and another conduit 61. The fluid amplifier 15 is illustrated diagrammatically and may be of any suitable conventional type such as model 2010 manufactured by Northeast Engineering Inc. of Hamden, Conn.

Generally the function of the amplifier 15 is to selectively provide a flow passageway between the conduits 59 and 61 or to block flow therebetween. This function can be illustrated diagrammatically as shown in FIG. 1 where the rise in pressure in the conduit 47 forces a plunger 63 downwardly to align a passageway 65 therein with the conduits 59 and 61 to thereby permit flow of an operating fluid, such as air under relatively high pressure, from the conduit 59 into the conduit 61 which conducts the operating fluid to some equipment to perform work. If one of the objects 55 were to be missing, the pressure in the conduit 47 would drop to allow biasing means 67 to move the plunger 63 and the passageway 65 to break the communication between the conduits 59 and 61.

The objects 55 should be moved sequentially beneath the opening 53 at a sufficient speed so that the interval during which no object is beneath the opening 53 is insufficient to permit deactivation of the amplifier 15. An accumulator 69 may be provided to further guard against deactivation of the amplifier. On the other hand, if a pulsed back pressure output is desired, as when the output device is a counter, the accumulator 69 may be eliminated and/or movement of the objects may be slowed sufficiently to provide the desired pulses.

FIG. 3 illustrates a proximity sensor 67 which is identical to the proximity sensor 13 except in the respects specifically noted herein. For simplicity, corresponding parts of the sensor 67 are designated by corresponding primed reference characters. The sensor 67 has a supply passageway 25' and a back pressure passageway 27', the axes of which intersect at a point of intersection 51'. The passageway 25' has passage sections $a'$ and $c'$, the axes of which intersect at the point of intersection 51 to define an included angle of a 150°. This included angle may range from 135° to 180°. In the embodiment shown in FIG. 3, the axis of the back pressure passageway 27 and an extension of the axis of the passage section $c'$ intersect to form an included angle of approximately 14½° as in the form shown in FIGS. 1 and 2. The proximity sensor 67 has an outer surface 69 which is arranged to be generally perpendicular to the axis of the section $a'$.

Although exemplary embodiments of the invention have been shown and described, many changes, modifications, and substitutions may be made by one having ordinary skill in the art without necessarily departing from the spirit and scope of this invention.

I claim:

1. An apparatus connectable to a source of fluid under pressure for sensing a detectible body, said apparatus comprising:

a first conduit means having an inlet connectable to the source of fluid under pressure for conducting some of the fluid under pressure away from the inlet, said first conduit means having an opening spaced from the inlet adjacent which the detectible body can be positioned to permit the fluid under pressure to flow through said first conduit means and said opening therein and strike the detectible body;

second conduit means having an inlet and an outlet with said inlet being connected to a region of said first conduit means intermediate said inlet thereof and said opening to thereby permit flow of the fluid from said first conduit means to said second conduit means, said second conduit means forming an acute angle with an extension of the axis of the portion of said first conduit means between said region and said opening whereby relatively positioning the detectible body and the opening to bring the detectible body adjacent the opening in the first conduit means restricts flow of the fluid through said opening and causes flow of at least a predetermined amount of the fluid from said first conduit means to said second conduit means; and output means in fluid communication with said outlet of said second conduit means operative in response to the flow of at least said predetermined amount of fluid through said second conduit means.

2. An apparatus as defined in claim 1 wherein said acute angle is between about 10° to about 20°.

3. An apparatus as defined in claim 1 wherein said first conduit means downstream of said region thereof defines, in sequence, an outlet leg and a sensing passageway with said sensing tube having said opening therein, the cross sectional area of said sensing passageway being larger than the cross sectional area of said outlet leg.

4. An apparatus as defined in claim 1 wherein the portions of said first conduit means on each side of said region thereof define leg portions of said first conduit means and a portion of said second conduit means extending outwardly from said region defines a leg portion of said second conduit means, each of said leg portions being of generally circular cross section, said leg portions being of substantially equal lengths and of substantially equal diameters.

5. An apparatus connectable to a source of fluid under pressure for sensing a detectible body, said apparatus comprising:

a body member having a smooth walled supply passageway extending therethrough, said supply passageway having an inlet connectable to the source of fluid under pressure, said supply passageway having an outlet remote from said inlet;

said body member having a smooth-walled back pressure passageway therein extending from a region of said supply passageway intermediate said inlet and outlet thereof to an outer surface of the body member, said back pressure passageway forming an included angle of greater than 90° with the portion of said supply passageway between said region and said outlet;

a sensing tube connectable to said body member, and having a smooth-walled sensing passageway therein in communication with said outlet of said first passageway, said sensing tube terminating in an open end for directing the fluid against the detectible body when the detectible body is adjacent the open end in generally confronting relationship thereto, the presence of said detectible body adjacent said open end restricting the flow of the fluid through said open end and causing a fluid pressure rise in said back-pressure passageway; and control means operative in response to said fluid pressure rise in said back-pressure passageway.

6. An apparatus as defined in claim 5 wherein the portions of said passageways adjacent said region of said first passageway define three passage sections of said passageways, the cross sectional area of the sensing passageway being greater than the cross sectional area of said passage section of said supply passageway downstream of said region, and said apparatus including means for releasably securing said sensing tube to said body member to thereby permit changing of the cross sectional area relationship between said sensing passageway and said last mentioned passage section to thereby change the maximum sensing distance.

7. An apparatus as set forth in claim 6 wherein each of said passage sections is generally circular in cross section and said leg portions are of substantially equal axial length and diameter, the sensing passageway through said sensing tube being generally circular in cross section and having an inside diameter of at least about $\frac{1}{32}$ inch greater than the diameter of said passage sections, and said angle is between about 170° to about 160°.

8. An apparatus connectable to a source of fluid under pressure for sensing a detectible body, said apparatus comprising:

means defining a first passageway having an inlet connectable to the source of fluid under pressure, said first passageway having an outlet remote from said inlet;

means defining a back-pressure passageway having an inlet and an outlet with said inlet of said back pressure passageway being joined to a region of said first passageway intermediate said inlet and outlet thereof whereby said passageways are in fluid communication with each other;

the portions of said first passageway adjacent said region of said first passageway defining an inlet leg portion and an outlet leg portion, respectively, of said first passageway and the portion of said back pressure passageway adjacent said region defining a back pressure leg;

means defining a sensing passageway joined to the outlet of said first passageway in communication therewith, said sensing passageway having an opening remote from said outlet of said first passageway, the cross sectional area of said sensing passageway being greater than the cross sectional area of the outlet leg portion of the first passageway whereby the presence of the detectible body adjacent the opening in the sensing passageway restricts the flow of fluid therethrough and causes at least a predetermined amount of the fluid to flow from said first passageway into said back pressure passageway; and control means in fluid communication with said outlet of said back pressure passage means operative in response to the flow of at least said predetermined amount of fluid through said back pressure passage.

9. An apparatus as defined in claim 8 wherein the outlet leg portion of said first passageway and said sensing passageway are generally circular in cross section and the diameter of said sensing passageway is at least about $\frac{1}{32}$ inch greater than the diameter of said outlet leg portion of said first passageway.

10. An apparatus as defined in claim 8 wherein said leg portions have substantially equal cross sectional areas and are of substantially equal lengths.

11. An apparatus connectable to a source of fluid under pressure for sensing the presence of a detectible body, said apparatus comprising:

a body member having a first smooth-walled passageway extending therethrough, said passageway having an inlet connectable to the source of fluid under pressure, said first passageway having an outlet;

said body member having a smooth-walled back-pressure passageway therein extending from a region of said first passageway intermediate said inlet and said outlet thereof to an outer surface of the body member, the axes of said passageways intersecting to define a point, the portions of said passageways extending outwardly from said point defining leg portions of said passageway, said leg portions being substantially cylindrical and having substantially equal diameters, the length of said leg portions from said point to the outer ends thereof being substantially equal and being no less than about ½ inch;

means defining a sensing passageway adjacent said outlet of said first passageway and in communication therewith, said sensing passageway having an opening remote from said outlet of said first passageway, the presence of the detectible body adjacent said opening restricting the flow of fluid through the opening and causing at least a predetermined amount of the fluid to flow from said first passageway into said back pressure passageway; and output means operative in response to the flow of at least said predetermined amount of fluid through said back pressure passageway.

12. A fluidic proximity sensor for sensing a detectible substance comprising:

a body member having inlet, outlet, and back pressure passageways therein, said passageways intersecting at a region within said body member and extending outwardly from said region to the outer surface of said body member, said inlet passageway being connectable to a source of control fluid under pressure;

each of said passageways defining a smooth-walled passage section extending outwardly from said region, each of said passage sections being generally circular in cross section, the length of said passage sections being substantially equal and the diameter of said passage sections being substantially equal;

said back pressure passageway intersecting said outlet passageway at an angle greater than 90°; and a sensing tube removably attached to said body member adjacent the outlet of said outlet passage section, said sensing tube having a sensing passageway extending therethrough in communication with said outlet passageway, said sensing passageway terminating in an opening downstream of said outlet passageway, said sensing passageway being of generally circular cross section and having a diameter greater than the diameter of said passage sections, the detectible substance and the sensor being relatively positionable to bring the detectible substance adjacent said opening to restrict the flow of fluid therethrough to cause flow of at least a predetermined amount of the fluid from the inlet passageway into the back pressure passageway to thereby indicate the presence of the detectible substance adjacent said opening.

13. A proximity sensor as defined in claim 12 wherein the sensing passageway has a diameter of at least about 1/32" greater than the diameter of the passage sections.

14. A proximity sensor as defined in claim 12 wherein said angle is between about 166° to about 165°.

15. A proximity sensor as defined in claim 12 wherein said inlet and outlet passageways are axially aligned.

References Cited

UNITED STATES PATENTS

| | | |
|---|---|---|
| 2,907,337 | 10/1959 | Bemporad. |
| 3,232,095 | 2/1966 | Symnoski _____ 73—37.5 |
| 3,273,378 | 9/1966 | Gesell _____ 73—37.9 |
| 3,292,623 | 12/1966 | Warren _____ 137—81.5 XR |

LOUIS R. PRINCE, Primary Examiner

W. A. HENRY II, Assistant Examiner